United States Patent [19]
Weisser

[11] Patent Number: 5,229,998
[45] Date of Patent: Jul. 20, 1993

[54] METHOD OF REDUCING THE LOW-FREQUENCY COMPONENT OF JITTER IN A DIGITAL DATA TRANSMISSION SYSTEM

[75] Inventor: Alain Weisser, Clamart, France

[73] Assignee: Telediffusion De France, Paris, France

[21] Appl. No.: 707,645

[22] Filed: May 30, 1991

[30] Foreign Application Priority Data

Jun. 1, 1990 [FR] France ................. 90 06885

[51] Int. Cl.⁵ ............................ H04J 3/06; H04L 7/00
[52] U.S. Cl. ................................... 370/108; 370/112; 375/118
[58] Field of Search ............... 370/108, 112; 307/243; 328/104; 375/118, 119

[56] References Cited

U.S. PATENT DOCUMENTS 4,133,981  1/1979  Kibler ................. 370/112
4,604,582  8/1986  Strenkowski et al. ....... 370/108
4,775,987  10/1988  Miller ................. 370/108

FOREIGN PATENT DOCUMENTS 3207989  8/1983  Fed. Rep. of Germany .

Primary Examiner—Douglas W. Olms
Assistant Examiner—Min Jung
Attorney, Agent, or Firm—Bachman & LaPointe

[57] ABSTRACT

A digital data transmission system comprises at its input a higher order multiplexer receiving at least one stream of digitized data organized into blocks and at a specific timing, said multiplexer transmitting each block of data in a digital multiplex to the output of the transmission system via a digitized data transmission channel subject to a variable multiplexing delay. To reduce the low-frequency component of the jitter in a timing signal reconstituted at the output of the system, the multiplexing delay is measured for the current transmission of a block of data in the multiplex and the measured multiplexing delay is compared with a reference value to determine a multiplexing delay offset and if necessary to defer said current transmission. The measurement and comparison are repeated for the next transmission of a block of data in the multiplex using in the comparison the multiplexing offsets determined for previous transmissions.

9 Claims, 1 Drawing Sheet

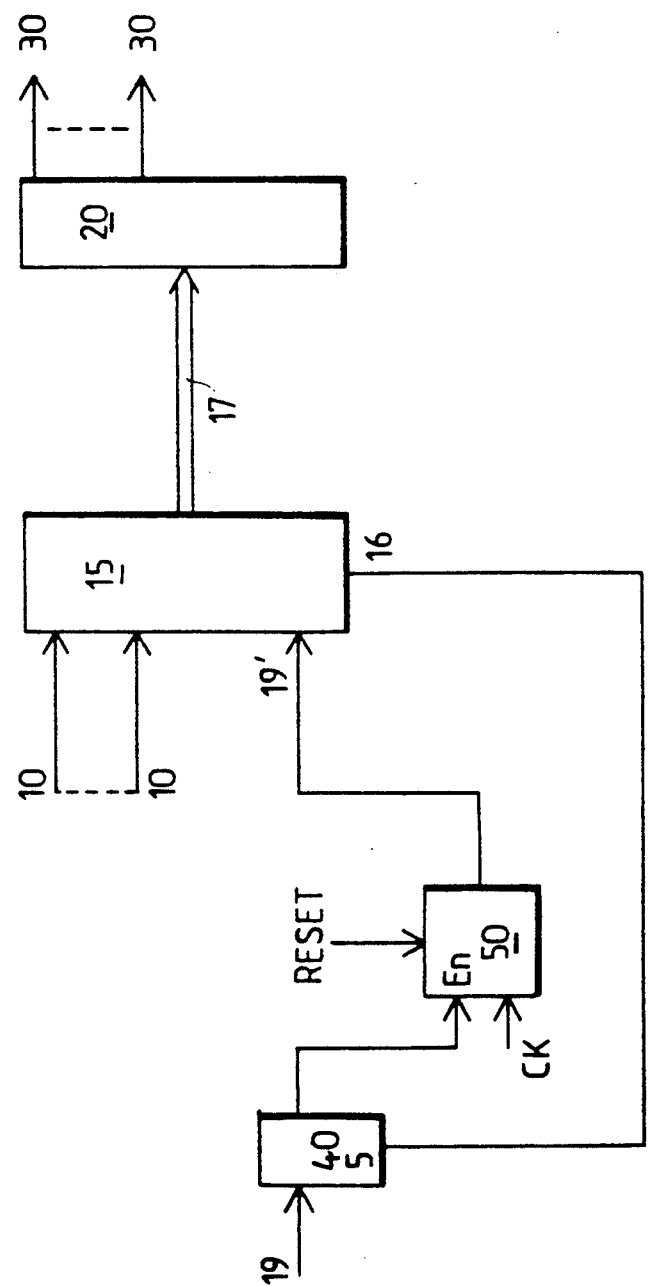

METHOD OF REDUCING THE LOW-FREQUENCY COMPONENT OF JITTER IN A DIGITAL DATA TRANSMISSION SYSTEM

BACKGROUND OF THE INVENTION

1. Field of the Invention

The invention concerns asynchronous digital data transmission systems. The invention is more particularly concerned with a method of reducing the low-frequency component of the jitter in a timing signal reconstituted at the output of a digital data transmission system of the type comprising at its input a higher order multiplexer receiving at least one stream of digitized data organized into blocks and having a particular timing, said multiplexer sending each block of data in a digital multiplex to the output of the transmission system via a transmission channel subject a variable multiplexing delay.

2. Description of the Prior Art

A digital data transmission system including a higher order digital multiplexing equipment is known to create jitter in the timing signal reconstituted at the output of the transmission system. A transmission system of this kind enables changes between different standardized or non-standardized hierarchical orders to apply to diverse transmission media a digital multiplex signal having specific characteristics (throughput, level, signal waveform, etc. The (in practise) asynchronous data streams arriving in parallel at the multiplexing equipment are received in storage means of the multiplexing equipment to allow for their asynchronous nature. The digital multiplex constructed from the stored data is transmitted at successive periodic times at the multiplexing equipment output timing. At the transmission system output the digital multiplex is decoded by means for decoding the multiplexed data such as a demultiplexer, the decoding means reconstituting a timing signal used to extract the data from the multiplex on the basis of the times at which data appears. The reconstituted timing signal at the transmission system output is affected by jitter which is due to fluctuations in the multiplexing delay conditioned by phase relationships between the times of arrival of the data at the multiplexer input and the opportunities to send said data in the multiplex. The jitter affecting the reconstituted signal is more accentuated when multiplexing is carried out on blocks of data (packet multiplexing) rather than on binary units (bit by bit multiplexing). Taking the example of a packet multiplexer in which the packet input timing is close to a submultiple of the multiplexed packet output timing, the relative phase of the packet arrival times and the packet sending times is subject to long term slip because of the unfavorable timing ratio which produces one or more phase jumps in the reconstituted timing signal. This low-frequency component of the jitter causes errors in decoding the multiplex data such as incorrect routing of the demultiplexed data.

A known way to reduce the jitter is to choose a ratio between the relative timings of the input tributaries of a higher order multiplexer and the multiplex signal at the multiplexer output which is sufficiently complex to achieve high-frequency phase beating that is likely to be easier to filter. CCITT Recommendation G.742, for example, describes a method for multiplexing four 2 048 kbit/s channels into an 8 448 kbit/s multiplex. This multiplex uses a frame of 848 bits repeated approximately every 100.38 microseconds. Such ratios complicate the transmission system, however, imposing operating constraints and limiting its flexibility of use.

Reducing the jitter has also been attempted by increasing the effectiveness of the reconstituted timing signal filter using a phase-locked loop. These techniques increase the time to synchronize the transmission systems, however, because the synchronization time is conditioned by the time constant of the loop.

Procedures for using signals which tolerate a high level of jitter are known and complement the jitter reduction techniques in the digital data transmission systems previously mentioned. They are extremely complex and somewhat unreliable, however. Also, the low-frequency component of the jitter is still present. Consequently, an object of the present invention is to alleviate the drawbacks of the techniques described above.

Differing in this respect from the known techniques described above, the invention starts from the observation that it is preferable to attempt to reduce the jitter in the reconstituted timing signal by controlling the process which generates the jitter, in other words the higher order multiplexer. This is achieved by forcing the multiplexer to introduce an appropriate multiplexing delay so that the multiplexing delay variations compensate each other and the mean multiplexing delay is constant in the long term. This eliminates the low-frequency component of the jitter in the reconstituted signal at the transmission system output. This method is simple and inexpensive to implement.

SUMMARY OF THE INVENTION

The invention consists in a method of reducing the low-frequency component of the jitter in a timing signal reconstituted at the output of a digital data transmission system of the type comprising at its input a higher order multiplexer receiving at least one stream of digitized data organized into blocks and at a specific timing, said multiplexer transmitting each block of data in a digital multiplex to the output of the transmission system via a digitized data transmission channel subject to a variable multiplexing delay, in which method:

a) the multiplexing delay is measured for the current transmission of a block of data in the multiplex, b) the measured multiplexing delay is compared with a reference value to determine a multiplexing delay offset and if necessary to defer said current transmission, c) stages a) and b) are repeated for the next transmission of a block of data in the multiplex using in stage b) the multiplexing delay offsets determined for previous transmissions.

BRIEF DESCRIPTION OF THE DRAWING

Other characteristics and advantages of the invention will emerge more clearly from the following description and the appended drawing which is a diagram showing a device for measuring and controlling the multiplexing delay of a higher order multiplexer.

DETAILED DESCRIPTION OF THE INVENTION

Referring to the figure, a higher order multiplexer 15 constitutes the input of a digital data transmission system. The multiplexer 15 receives on a plurality of inputs 10 digitized data streams organized into blocks from various tributaries to output them in a digital multiplex on a transmission channel 17 connected at the output of the transmission system to a multiplexed decoder device such as a demultiplexer 20 which, on the basis of the times at which the multiplexed data blocks arrive, reconstitutes a timing signal for decoding the digitized data to be delivered to a plurality of channels 30, as will be familiar to those skilled in the art. It should be understood that the data blocks received at the input of the multiplexer 15 may be bits, bytes or variable length packets of bits. Of course, the digitized data can be multiplexed at bit or packet level without departing from the scope of the invention.

The multiplexer 15 comprises, in addition to input channels 10 for the digitized data to be multiplexed, an input 19 for receiving a signal indicating the availability of a block of data on one of the input channels 10. The multiplexer 15 further comprises, in addition to the digital multiplex output connected to the transmission channel 17, an output 16 for transmitting a signal indicating that the block of data at an input 10 of the multiplexer has been sent in the multiplex. To simplify the description of the invention, reference will be made hereinafter only to one input channel 10 because the method in accordance with the invention is preferably applied in exactly the same way to each input channel of the multiplexer 15. It must also be understood that the signals representing the availability of a block of data at the multiplexer input and the acknowledgement of transmission of a block of data in the multiplex are signals internal to the multiplexer 15. They are shown as external to the multiplexing unit in order to clarify the description.

According to the invention, the transmission times of the multiplexer 15 are controlled on the basis of variations in the multiplexing delay to obtain a mean multiplexing delay which is constant in the long term so as to eliminate the low-frequency component of the jitter in the timing signal reconstituted by the demultiplexer 20. In a prior art transmission system, the function of the signal representing the availability of a block of data at the input of the multiplexer is to command the multiplexer to send the block of data in the multiplex at the first opportunity. According to the invention, the signal representing the presence of a block of data at an input 10 of the multiplexer 15 (referred to hereinafter as the signal 19) is applied to an input of a multiplexing time measurement circuit receiving on a second input the signal acknowledging transmission of the block of data in the multiplex (hereinafter referred to as the signal 16). This circuit therefore measures a time period representing a variable multiplexing delay for each block of data transmitted in the multiplex and filters the low-frequency components of the delay variations in order to defer, if necessary, the transmission of the current block of data by delaying the signal 19 representing its presence. This is the signal 19' in the figure. Filtering consists in determining for each block transmitted a multiplexing delay offset by comparing the measured multiplexing delay and a reference value, allowing for previous multiplexing delay offsets.

The circuit for measuring the multiplexing delay measures the delay digitally and comprises a flip-flop 40 which receives on respective inputs the signals 19 and 16 respectively representing the presence of a block of data at the input of the multiplexer 15 and acknowledging the transmission of a block of data in the multiplex to provide a start and end of counting signal, a counting circuit 50 such as a binary counter which receives on a count enable input said start and end of counting signal shaped by the flip-flop 40 to provide the delayed signal 19' commanding the multiplexer 15 to send a block of data in the multiplex when a predetermined count is reached. It will be understood that the signal 19' is equivalent to the signal 19 except that the command information that it conveys is delayed by the measurement circuit which will now be described.

The operation of the measurement device for implementing the method in accordance with the invention will now be described. When a block of data is present at the input of the multiplexer 15 on the channel 10, the signal 19 sets the flip-flop 40. The flip-flop 40 applies to the input En of the counter 50 a start count signal. The counter 50 is reset at the start of transmission by a RESET line and begins to count under the control of a clock CK whose frequency Fo is large in comparison with the timing of transmission of blocks of data in the multiplex. When the counter 50 has counted a predetermined number of clock pulses, it applies the signal 19' to the multiplexer 15 to command the transmission of the block of data in the multiplex at the next opportunity. It will be understood that the predetermined number of clock pulses may, for example, represent the maximum count value of the counter 50 and that the signal 19' represents an overflow signal of the counter, as will be clear to those skilled in the art. Knowing the frequency Fo of the clock CK, it is easy to determine a number No of clock pulses for the counter 50 such that the counter 50 overflows after a time reference value substantially equivalent to a predetermined multiplexing delay value. After the counter 50 overflows it continues to count under the control of the clock CK from a self-reset state until the multiplexer 15 delivers the signal 16 acknowledging transmission of the block of data in the multiplex. When the signal 16 is applied to the input of the flip-flop 40, the latter applies to the input En of the counter an end counting signal which disables the counter 50. The command to transmit a block of data in the multiplex is therefore delayed for the first block of data by a delay $R_0$ equal to $N_0/F_0$. If the signal 16 acknowledging transmission of the block of data in the multiplex interrupts counting by the counter 50, the state of the counter 50 represents the offset $t_1$ between the transmission delay of the first block of data and the value $R_0$ because the time at which the multiplexer can transmit a block of data does not always follow on immediately from the time at which the counter 50 overflows.

Because of this simple design of the measurement circuit, the result of comparing the multiplexing delay with the reference value is provided directly by the overflow signal at the output of the counter 50, which implies that the chosen reference value determines the counting capacity of the counter 50. Also, the self-resetting of the counter 50 when it overflows amounts to subtracting the reference value from the measured multiplexing delay value.

Of course, equivalent circuits could be designed in which the comparison and the subtraction are carried out by a comparator or like circuit appropriately connected to the counter 50 to compare, on each clock pulse, the content of the counter 50 with a reference value applied to a second input of the comparator and a subtractor circuit comparing the total number of clock pulses measured by the counter 50 with a number of clock pulses representing a predetermined reference value, as will be familiar to those skilled in the art.

When the comparator detects that the content of the counter 50 is greater than or equal to the chosen reference value, it outputs the signal 19' telling the multiplexer 15 that a block of data is present on an input channel 10.

As soon as a second block of data is present on the input channel 10 of the multiplexer 15 the signal 19 activates the counter 50 via the flip-flop 40. Unlike the previous cycle, the counter 50 begins to count from the value representing the offset $t_1$. The counter 50 overflows after a time $R_0-t_1$ and then outputs the signal 19' commanding transmission of the block of data in the multiplex. This command is therefore brought forward to allow for the delay caused when the previous block of data was transmitted. As soon as the block of data is transmitted in the multiplex by the multiplexer 15, the latter outputs the signal 16 acknowledging transmission which prevents the counter 50 counting via the flip-flop 40 as already explained. The value in counter 50 at this time represents a new multiplexing delay offset $t_2$ which will be carried forward to the next cycle, and this process repeats. In this way the multiplexing delay offsets t are accumulated from cycle to cycle by successively carrying forward a multiplexing delay offset for the transmission of one block into the measured multiplexing delay for transmission of the next block.

When the nth block of data is present on the input channel 10 of the multiplexer 15 the flip-flop 40 is set for the nth time and the number of pulses counted by the counter 50 is equal to $n \times N_0$. When the multiplexer 15 transmits the nth block of data in the digital multiplex, the sum of the multiplexing delays measured by the counter 50 is between $n \times R_0$ and $n \times R0+t$ where t represents the maximum multiplexing delay offset. Consequently, variations of the multiplexing delay relative to each block of data transmitted in the multiplex compensate each other in the long term and the mean multiplexing delay tends towards a constant value $R_0$.

A multiplexing delay reference value $R_0$ greater than the maximum multiplexing delay is preferably chosen to achieve total compensation of the multiplexing delay offsets.

It will be noted that the device for implementing the method in accordance with the invention for reducing the low-frequency component of the jitter in the reconstituted timing signal is essentially in the form of a time quantizing circuit followed by an error measurement and feedback system. The method in accordance with the invention can also be implemented using an analog circuit equivalent to the circuit described above. An analog circuit would comprise, for example, an operational amplifier configured as a low-pass filter or as an integrator to filter the low-frequency components of the multiplexing delay offsets. The comparison function could be implemented by a threshold circuit connected to the operational amplifier to supply the signal 19' commanding the multiplexer 15 to transmit a block of data in the multiplex. As previously mentioned, an analog circuit of this kind measures the multiplexing delay introduced by the multiplexer 15 and compares it with a reference value. If a circuit of this kind is configured as an integrator, it accumulates block by block for each multiplexer transmit cycle the offsets measured between the noted waiting times and this reference value. When the integrator reaches a particular limiting value, the output of the threshold circuit forces the multiplexer 15 to transmit the next block (or one of the subsequent blocks) at the end of a delay less than the set point time given by the reference value. The effect of this is to decrease the content of the integrator. On the other hand, if the integrator falls below this limiting value, the threshold circuit forces the multiplexer to exceed the set point time. Because the integral of the measured offsets is limited, the mean multiplexing delay is strictly equal to the set point value and the low-frequency components of the jitter in the reconstituted signal remain at a low level.

Of course, the device for implementing the method in accordance with the invention is described above by way of non-limiting example only and may be modified without departing from the scope of the invention.

There is claimed:

1. Method of reducing the low-frequency component of the jitter in a timing signal reconstituted at the output of a digital data transmission system of the type comprising at its input a higher order multiplexer receiving at least two streams of digitized data organized into blocks and at a specific timing, said multiplexer transmitting each block of data in a digital multiplex to the output of the transmission system via a digitized data transmission channel subject to a variable multiplexing delay, in which method:
   a) the multiplexing delay is measured for the current transmission of a block of data in the multiplex,
   b) the measured multiplexing delay is compared with a reference value to determine a multiplexing delay offset and selectively defer said current transmission,
   c) stages a) and b) are repeated for the next transmission of a block of data in the multiplex using in stage b) the multiplexing delay offsets determined for previous transmissions.

2. Method according to claim 1 wherein the use in stage c) of the multiplexing delay offsets determined for previous transmissions consists in successively accumulating said multiplexing delay offsets and compensating for the accumulative result when comparing the multiplexing delay with said reference value.

3. Method according to claim 1 wherein said multiplexing delay reference value is greater than the maximum multiplexing delay value.

4. Method according to claim 1 wherein the multiplexing delay is measured by means of a counter incremented by clock pulses.

5. Method according to claim 4 wherein the multiplexing delay reference value represented by a predetermined number of clock pulses.

6. Method according to claim 5 wherein the transmission of a block of data in the multiplex is deferred if the count value of said counter is not at least equal to the multiplexing delay reference value.

7. Method according to claim 5 wherein the multiplexing delay time reference value is the value when said counter overflows.

8. Method according to claim 5 wherein the multiplexing delay offset is determined by subtracting from the value of the counter when the block of data is transmitted in the multiplex the count value representing the multiplexing delay reference value.

9. Method according to claim 4 wherein the multiplexing delay offsets are accumulated by successively carrying forward a multiplexing delay offset for the transmission into the measured multiplexing delay for transmission of the next block.

* * * * *